United States Patent Office 3,379,530
Patented Apr. 23, 1968

3,379,530
PROCESS FOR PROVIDING SIZE ADJUSTMENT IN VIEWING AZIMUTH DEFINING MEANS
Donald J. Howe, Rochester, N.Y., assignor to Eastman Kodak Company, Rochester, N.Y., a corporation of New Jersey
Filed Aug. 19, 1964, Ser. No. 390,698
15 Claims. (Cl. 96—40)

ABSTRACT OF THE DISCLOSURE

A process for producing a stereoscopic or changeable picture in which a lineiform photographic image is made by exposure through a lenticular screen of linearly varying pitch. A viewing screen is then superimposed over a picture made from the lineiform image, the viewing screen lenticules having a pitch which substantially matches that of the lines of the picture image.

---

Figure 1:
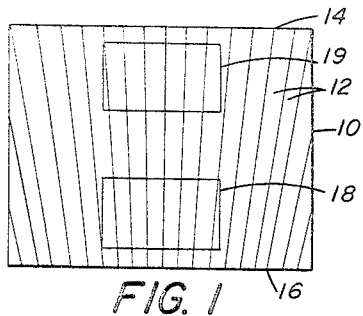

This invention relates to lineiform pictures for stereo effects, changing pictures and the like, and more particularly to a process and article which allow a size adjustment to be made in the viewing screen to provide accurate registration between the viewing screen and the lineiform image constituting the picture.

Stereoscopic pictures, changing pictures, and the like may consist of a vertical lenticular viewing screen or a vertical line viewing screen, such screens being hereinafter referred to as "viewing azimuth defining means," in overlying contact with a picture having a plurality of contiguous images such as right- and left-hand line images, hereinafter referred to as line images or lineiform images. Cameras used in the production of pictures having such lineiform images employ a vertical lenticular taking screen or a vertical line taking screen, hereinafter referred to as "exposure azimuth defining means," through which the subject is photographed. As is customary, the term "vertical" is merely relative to the viewing plane of both eyes as "horizontal." The viewing screen or viewing azimuth defining means must accurately match the periodic structure of the lineiform image of the underlying picture. However, it has been found that dimensional changes may occur in the picture between the time that the exposure is made through the taking screen and the time when the picture is provided with the viewing azimuth defining means. It is usually necessary, therefore, for the viewing azimuth defining means to have a slightly different pitch from that of the taking screen in order to compensate for any such dimensional changes. The term "pitch," when referring to line screens, to lenticular screens of the type having cylindrical lenticules, and to line images, means the distance between a point at the center of one lenticule or one transparent "line" or one line respectively, and the corresponding point on the next lenticule or transparent line or line, the distance being measured perpendicularly to the direction of the lenticule, the transparent 'line" or the line of the image. Likewise, the "size" of such screens refers to the "pitch," so that a "larger" screen means a coarser one or one with a larger pitch. The term "elements," when referring to azimuth defining means, hereinafter means the lenticules of a lenticular screen and the transparent "lines" of a line screen.

In one method of providing a picture having a lineiform image with a lenticular screen, the picture is coated with a suitable thermoplastic material and the coating embossed to form a lenticular screen. One proposed method of providing a size adjustment in the embossing plate and therefore in the lenticular screen, to make the lenticular screen accurately match the periodic structure of the picture, is to use thermal expansion of an embossing roller, see U.S. Patent No. 3,100,439, issued Aug. 13, 1963, to S. L. Leach. However, the large dimensional changes which occur during photographic processing of certain types of film make it impossible to use this method of compensation because of the limited amount of thermal expansion or contraction of which the embossing roller is capable—particularly within the range of temperatures tolerable for molding a thermoplastic material.

It is an object of the present invention to provide a process for making stereoscopic pictures, changing pictures, and the like which allows an adjustment to be made in the size of the viewing azimuth defining means to provide accurate matching between the lineiform image of the picture and the viewing azimuth defining means.

It is another object of the present invention to provide a process which allows an adjustment to be made in the size of an embossed lenticular screen of a lenticular stereo picture during the embossing step, without relying on thermal expansion.

It is another object of the invention to provide variable pitch screens for use in such processes and to provide pictures produced by such processes.

These objects are accomplished by the present invention as follows. A screen according to the present invention has a pitch which varies linearly and in one direction across the screen. Such direction may be in the direction of the lenticules or lines, perpendicular to the lenticules or lines, or at any angle in-between. One section of such a screen is employed as the taking screen. As a result of certain dimensional changes which may occur in the picture, the same section of the taking screen will not accurately match the periodic structure of the picture. However, a second section of this screen or of a screen of identical pitch will accurately match the periodic structure of the picture. According to a preferred embodiment of the invention, a picture having a lineiform image is produced by exposure through a taking screen having a pitch which varies linearly in one direction across the screen. A suitable thermoplastic coating is then applied to the picture. An embossing plate, mounted on an embossing roller, is employed which will produce an embossed lenticular screen having a linearly varying pitch identical to that of the taking screen. A test portion of the coating is then embossed with one area of the embossing plate and the amount of misregister is noted, for example, by measuring the displacement between one index mark on the picture and another one on the embossed coating. The necessary size adjustment is then made by moving the embossing roller by an amount sufficient to eliminate such displacement. The coating is then embossed with that area of the embossing plate which produces a lenticular screen which matches the periodic structure of the image. The present invention is clearly applicable whether the dimensional change of the picture is an expansion or a contraction.

Figure 2:
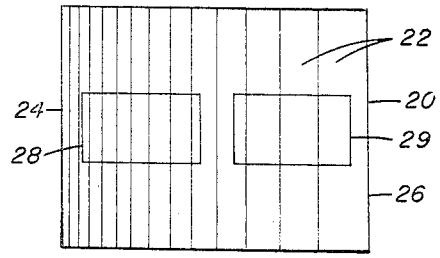
Figure 3:
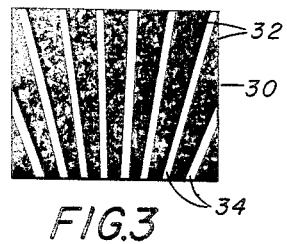
Figure 4:
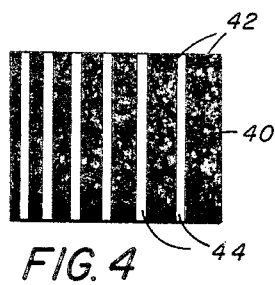
Figure 5:
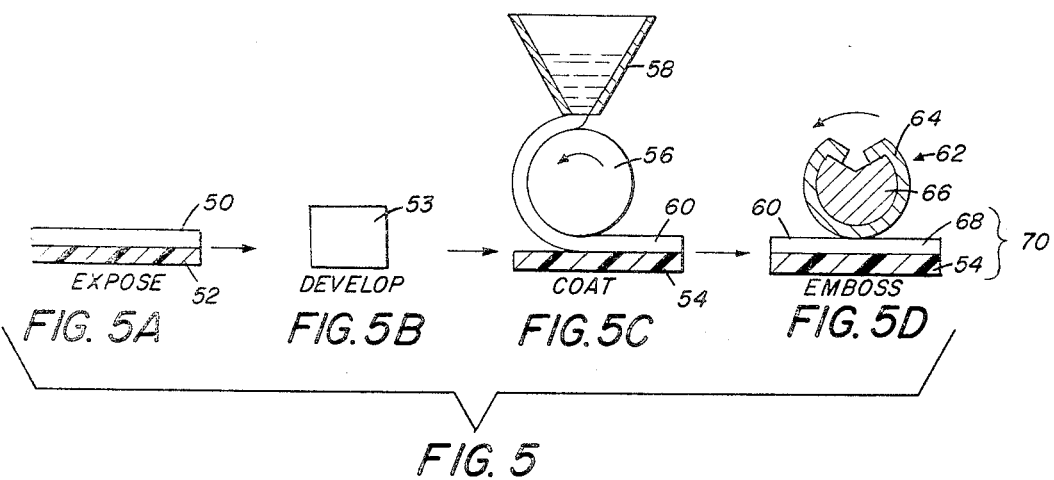

These and other objects of the invention will be more fully understod by reference to the following detailed description when read in connection with the accompanying drawing in which:

FIGS. 1 and 2 are enlarged plan views of two different lenticular screens of the present invention,
FIGS. 3 and 4 are enlarged plan views of two different line screens of the present invention, and
FIG. 5 illustrates schematically a process employing as some of its steps a preferred embodiment of the present invention.

FIG. 1 is an enlarged plan view of a lenticular screen 10 of the present invention having cylindrical lenticules 12 in which the pitch of the lenticules 12 increases linearly from the bottom of the screen to the top. In any one screen the lenticules 12 will have the same radius of curvature. The cross section of the lenticules 12 at the coarsest end 14 of the screen 10 may be a complete semicircle, while at the fine end 16 of the screen 10 the cross section of the lenticules 12 will have the same radius of curvature but will be less than a complete semicircle because of the intersection with adjacent lenticules 12. According to the present invention, a first section 18 of the screen 10 is used as the taking screen to produce a picture having a lineiform image. Assuming that the picture has undergone a certain amount of expansion, for example, said first section 18 of the screen 10 will no longer match the periodic structure of the lineiform image of the picture. However, a second section 19 of the screen 10 can be found in which the lenticules 12 will accurately match the periodic structure of the lineiform image of the picture.

FIG. 2 is an enlarged plan view of another lenticular screen of the present invention. The lenticular screen 20 contains parallel cylindrical lenticules 22. The pitch of the screen 20 increases linearly in a direction transverse to the direction of the lenticules 22 from one side 24 of the screen 20 to the other side 26. Again, the lenticules 22 have a constant radius of curvature. As discussed above with reference to the screen 10 of FIG. 1, one section of the screen 20, for example, section 28, is used as the taking screen to produce a picture having a lineiform image. Another section, for example, section 29, is then found which will accurately match the periodic structure of the lineiform image of the picture.

FIGS. 3 and 4 are enlarged plan views of line screens corresponding to the lenticular screens of FIGS. 1 and 2, respectively. The present invention is applicable to stereoscopic pictures, changing pictures, and the like, using either lenticular screens or line screens. The line screens 30 and 40, having the opaque portions 32 and 42 and the transparent portions 34 and 44, respectively, as shown in FIGS. 3 and 4, are used in the process of the invention in the same way as the lenticular screens 10 and 20 are used. The transparent "lines" 34 and 44 have the same width in any one line screen. FIGS. 1 and 3 show azimuth defining means having diverging elements and FIGS. 2 and 4 show parallel elements.

While the present invention has been described above with reference to using different sections of the same screen as the taking screen and as the viewing screen, it is to be understood that the more usual situation is that in which one screen is used as the taking screen and a second screen is used as the viewing screen. For example, when it is known that the dimensional change will be an expansion, the taking screen used in the camera need only be, say, section 18 of the lenticular screen 10 of FIG. 1. In order to produce the final stereoscopic or changing picture having an accurate match between the viewing screen and the periodic structure of the lineiform image, it is only necessary to find that section 19 of a viewing screen having a linearly varying pitch similar to that of the taking screen, which section 19 provides the necessary match. It is only necessary that the linearly varying pitch of the two screens be at substantially the same rate and direction (with respect to the direction of the elements).

FIG. 5 illustrates schematically a preferred embodiment of the process of the present invention; that is, a process for making a lineticular stereo picture in which the lenticular viewing screen is formed by embossing lenticules onto a suitable thermoplastic coating previously applied to a picture having a lineiform stereo image. A lenticular screen 50, identical to a section of either the screen 10 of FIG. 1 or the screen 20 of FIG. 2, is used as a taking screen through which a sheet 52 of film is exposed in a manner well known in the art to produce a picture 54 having a lineiform stereo image. Although in this preferred embodiment both the taking and the viewing screens are lenticular screens, it is noted that such is not necessary, e.g., a line taking screen may be used with a lenticular viewing screen. It is only necessary that the linearly varying pitch of the two screens be at substantially the same rate and direction (with respect to the direction of the elements). The production of the picture 54 may be by any known method, and forms no part of the present invention so it will not be described in detail here. The method, for example, can be to produce a line-image negative, which is then used in exposing a positive, followed by development to produce a picture having a lineiform image. The block diagram 53 "develop" of FIG. 5B serves to show the continuity between the expose step of FIG. 5A and the coating step of FIG. 5C. The picture 54 is coated with a suitable thermoplastic composition by means of a coating roller 56 and an associated hopper 58. The print 54 with its coating 60 is now ready for the embossing step shown in FIG. 5C. The embossing roller 62 consists of an embossing plate 64 attached to a roller 66. An embossing plate 64 is chosen which will produce a lenticular screen 68 having a linearly varying pitch similar to that of the lenticular taking screen 50. In order to produce a lenticular stereo picture 70 in which the lenticular screen 68 matches the periodic structure of the picture 54, it is only necessary to use the proper section of the embossing roller 62. The present invention provides a simple method to produce the necessary size adjustment. For example, when using an embossing plate which will produce the lenticular screen shown in FIG. 2, an axial shift of the roller 62 will provide the necessary size adjustment. Similarly, when using an embossing plate which will produce the screen shown in FIG. 1, a size adjustment during embossing can be made by adjusting the phase between the coating and the embossing rollers, for example, by means of a differential gear connected between the two rollers.

Methods are well known in the art for accurately matching a viewing screen to a picture having a lineiform image, and as such methods form no part of the present invention, they need not be described in detail here. A screen is matched to a line image when the screen is substantially in register with the image of the picture, i.e., when each element of the screen is essentially on top of one line of the line image. Index marks may be produced on the picture and the embossing roller may be provided with marking means. A test portion of the coating may be embossed, the displacement between the two marks noted, and the appropriate size adjustment made by using a different section of the embossing roller.

Although the present invention has been described above in detail with reference to lenticular screens in which the lenticules are all cylindrical and of equal radius of curvatures, variations of this are also possible. For example, lenticules of varying radius of curvature may be used; however, such lenticules will also change in focal length which would require a change in the thickness of the screen. Such screens may be difficult to produce. As discussed above, the present invention is not limited to the use of lenticular screens, since stereoscopic pictures, changing pictures, and the like can be made and viewed through line screens. The variable pitch line screens of FIGS. 3 and 4 may be produced optically. For example, the fanshaped line screen of FIG. 3 may be made by copying a uniformly ruled parallel-line Levy screen with a process camera with the copyboard and exposure planes titled to introduce the required keystone distortion.

Further, the method of producing the picture having a lineiform image may be silver halide photography, xerography, photoconductography, or any other known method.

Although the invention has been described in detail with particular reference to certain preferred embodiments thereof, variations and modifications can be effected within the spirit and scope of the invention as described above and as defined in the appended claims.

I claim:
1. In a photographic process in which a lineiform photographic image is made by exposure through expo- sure azimuth defining means and a picture having said image is viewed through viewing azimuth defining means superimposed over said picture and matched to the image, the improvement comprising:

employing for said exposure azimuth defining means, azimuth defining means having a substantially linearly varying pitch; and employing for said viewing azimuth defining means, azimuth defining means having a substantially linearly varying pitch with the rate and direction of variation substantially the same as that of said exposure azimuth defining means.

2. In a photographic process in which a first lineiform photographic image is made by exposure through exposure azimuth defining means and a picture having a second lineiform image made from said first image and identical thereto except for size is viewed through viewing azimuth defining means, the improvement comprising:

employing for said exposure azimuth defining means, azimuth defining means having a substantially linearly varying pitch;

employing for said viewing azimuth defining means, azimuth defining means having a substantially linearly varying pitch with the rate and direction of variation substantially the same as that of said exposure azimuth defining means; and matching said viewing azimuth defining means to said second image.

3. The process according to claim 2 in which said viewing azimuth defining means is a lenticular screen having approximately cylindrical lenticules embossed in situ on said picture by an embossing plate, and in which said matching is accomplished by the use of the matching area of said embossing plate.

4. The process according to claim 2 in which both azimuth defining means have parallel elements with a lateral change in spacing constituting said varying pitch and in which said matching employs an area of the viewing azimuth defining means laterally spaced from the area which is congruent with the area of the exposure means through which the exposure is made.

5. The process according to claim 2 in which both azimuth defining means have equally divergent elements and in which said matching employs an area of the viewing azimuth defining means spaced from the center of divergence a distance different from that of the area which is congruent to the area of the exposure means through which the exposure was made.

6. In a lenticular lineiform stereo process in which a first lineiform photographic image is made by exposure through exposure azimuth defining means and in which a picture having a second lineiform image made from said first image and identical thereto except for size is viewed through a lenticular viewing screen having approximately cylindrical lenticules and in which said viewing screen is superimposed over said picture by coating said picture with a suitable thermoplastic material and embossing said coating with an embossing plate to produce a lenticular screen, the improvement comprising:

employing for said exposure azimuth defining means, azimuth defining means having a substantially linearly varying pitch;

employing for said embossing plate, and embossing plate which is capable of producing a lenticular screen having a substantially linearly varying pitch with the rate and direction of variation approximately the same as that of said exposure azimuth defining means; and embossing said coating with that area of said embossing plate which produces a lenticular viewing screen having a pitch which substantially matches that of said second lineiform image.

7. In a photographic process in which a first lineiform photographic image is made by exposure through exposure azimuth defining means and a picture having a second lineiform image made from said first image is viewed through viewing azimuth defining means superimposed in matching relationship over said second image, the improvement comprising:

employing for said exposure azimuth defining means, azimuth defining means having a substantially linearly varying pitch; and employing for said viewing azimuth defining means, azimuth defining means having a substantially linearly varying pitch with the rate and direction of variation approximately the same as that of said exposure azimuth defining means.

8. The process according to claim 7 in which said viewing azimuth defining means having a substantially linearly varying pitch is a lenticular screen having cylindrical lenticules.

9. The process according to claim 8 in which said lenticules are parallel.

10. The process according to claim 8 in which the pitch of said lenticular screen varies in a direction substantially perpendicular to the direction of said lenticules.

11. A stereoscopic or changeable picture comprising a support layer having an opaque lineiform image on the viewable surface thereof, the vertically arranged lines of said image having a substantially linearly varying pitch, and a viewing azimuth defining means in overlying contact with said viewable surface, the exposed surface of said means being provided with vertically disposed lenticules having a linearly varying pitch which substantially matches that of said lines.

12. The picture of claim 11 in which said viewing azimuth defining means is a lenticular screen having cylindrical lenticules.

13. The picture of claim 12 in which said lenticules are parallel.

14. The picture of claim 12 in which the pitch of said lenticular screen varies in a direction substantially perpendicular to the direction of said lenticules.

15. A lenticular screen having parallel cylindrical lenticules of equal radius of curvature in which the pitch increases linearly from one side of said screen to the other in a direction transverse to the direction of said lenticules, said pitch at all points of said screen being no greater than twice said radius of curvature.

References Cited

UNITED STATES PATENTS

| | | | |
|---|---|---|---|
| 1,838,312 | 12/1931 | Kanolt | 96—40 |
| 2,005,777 | 6/1935 | Draper | 96—40 |

NORMAN G. TORCHIN, *Primary Examiner.*

R. H. SMITH, *Assistant Examiner.*

UNITED STATES PATENT OFFICE
CERTIFICATE OF CORRECTION

Patent No. 3,379,530                                      April 23, 1968

Donald J. Howe

It is certified that error appears in the above identified patent and that said Letters Patent are hereby corrected as shown below:

Column 6, line 34, "a support layer having an opaque lineiform" should read -- an opaque support layer having a lineiform --.

Signed and sealed this 16th day of September 1969.

(SEAL)
Attest:

Edward M. Fletcher, Jr.                              WILLIAM E. SCHUYLER, JR.
Attesting Officer                                          Commissioner of Patents